United States Patent Office 2,891,091
Patented June 16, 1959

2,891,091
DERIVATIVES OF PARA-AMINOSALICYLIC ACID

Marvin Darrach and William James Polglase, both of Vancouver, British Columbia, Canada, assignors to Canadian Patents and Development Limited, Ottawa, Ontario, Canada, a company No Drawing. Application June 3, 1957
Serial No. 662,989

5 Claims. (Cl. 260—479)

The present invention is concerned with the development of non-toxic, palatable derivatives of PAS (para-aminosalicylic acid) for use in retarding or preventing the development in the tubercle-bacillus of a resistance to antibiotic substances such as streptomycin. In particular the invention deals with amino acid derivatives of PAS.

It is an object of the present invention to produce amino acid derivatives of PAS that are palatable, non-nauseating, not hydrolysed by pepsin or trypsin, but hydrolysed by enzymes of the intestinal mucosa to the amino acid and PAS.

It is a further object of the invention to produce amino acid derivatives of PAS that when fed to humans will give significant blood levels of PAS.

The normal treatment of tuberculosis involves the use of PAS in conjunction with streptomycin or isoniazid (isonicotinic acid hydrozide).

The purpose of administering PAS is to prevent the development of strains of tubercle bacilli which are resistant to the companion drug, the dose of PAS usually being 10–15 grams per day. It has been established that approximately 30% of patients show toxic symptoms to PAS and some of these are so severe that the drug must be discontinued. Furthermore a 15-gram dose of PAS is often considered not sufficiently high for adequate therapy, but the toxicity of the drug limits the dosage that may be administered.

The toxic symptoms of PAS are gastro-intestinal disturbances.

A further problem faced by the applicants was the chemical instability of the PAS molecule which creates difficulties in its manufacture as well as in the dispensing of pharmaceutical preparations containing it.

The problem therefore was to invent a less toxic and more stable derivative of PAS.

Based on theoretical considerations, if the PAS molecule could be modified to give a non-toxic substance and if this non-toxic substance eventually gave rise to PAS in the blood, the problem would be solved. This might be accomplished by acylation of PAS with an amino acid which would be hydrolysed off by an enzyme of the small intestine, thus releasing the active drug for absorption into the blood. Since amino acids, being normal constituents of the human diet, are non-toxic, the use of an amino acid as a masking group precludes the possibility of introducing toxicity by chemical modification of PAS.

Therefore, specifically, the problem would be solved by showing that an amino acid derivative of PAS was hydrolysed in the intestinal mucosa, and was absorbed to yield PAS in the blood.

Limitations and drawbacks were characteristic of known apparatus, products and processes.

As indicated above under the limitations of the present treatment of tuberculosis involving PAS are the high incidence of gastro-intestinal disturbances and the frequent necessity for withdrawing the drug from an individual requiring PAS therapy.

A further and highly important limitation of the present form of PAS stems from its nauseating taste. For this reason the drug must be administered under supervision, as non-supervised patients will frequently discard it. This increases the cost of treating the tuberculosis patient. Furthermore, this nauseating property of PAS makes it impractical to consider widespread out-patient therapy which is followed widely especially in foreign countries where adequate sanitoria facilities are not available.

Applicants then were faced with the problem of preparing amino acid derivatives of PAS which would be pleasant to take and which could be tolerated by the patient because they would not produce gastro-intestinal disturbances. The derivatives would have to be prepared in such a manner that they would provide free PAS in the blood. With such a product it then would become possible to increase the dose of PAS, if indicated, and to supply PAS for out-patient treatment without constant supervision being necessary.

One of the novel aspects of the invention lies in the utilization of normal enzymes of the intestinal mucosa to release an active drug which has been chemically combined with a second factor for the specific purpose of masking toxic properties. However any amino acid selected must have the following characteristics:

(i) It must confer a pleasant taste on the compound.

(ii) It must not be hydrolysed from the compound by the enzymes of the stomach (e.g. pepsin) or of the pancreatic juice (e.g. trypsin, chymotrypsin, carboxypeptidase) but must be hydrolysed by enzymes of the intestinal mucosa.

(iii) It must be an amino acid which will give to the derivative desirable solubility properties.

(iv) It must be an amino acid which will render the derivative more stable in solution than the parent PAS molecule, which is very unstable.

Applicants now have succeeded in synthesising the glutamyl derivative of PAS and it meets all the requirements set out above. It is pleasant to the taste, it is not hydrolysed by the enzymes of the stomach or pancreas but is hydrolysed by the enzymes of the intestinal mucosa, it possesses excellent solubility, it is stable, and when administered to humans it gives significant blood levels of PAS. The substance has been tested clinically and is very satisfactory. No other amino acid derivative of PAS has the desirable properties found for glutamyl-PAS. None of the other known amino acids would be expected to confer on the final derivative the high solubility and pleasant taste found with the glutamyl derivative. Furthermore, glutamic acid is the second cheapest of the naturally-occurring amino acids. The only amino acid which is lower in cost than L-glutamic acid is glycine. The glycyl derivative of PAS has been prepared by the applicants.

The method of preparing this derivative will now be described as an example but not in any limiting sense.

PREPARATION OF GLUTAMYL-PAS (1) *Preparation of carbobenzoxy-L-glutamic acid*

| | Grams |
|---|---|
| L-glutamic acid (M.W. 147) | 14.7 |
| Carbobenzoxy chloride (M.W. 171) 17.1+20% | 20.5 |
| MgO (M.W. 40) | 6.5 |

The glutamic acid and MgO are dissolved in 100 cc. of $H_2O$ and this solution is covered with 30 cc. of ether. Carbobenzoxy chloride is added in small amounts over a period of 30 minutes, under cooling in a water bath of 0° C. and shaking continuously. The pH is checked with p Hydrion paper, and the solution is kept alkaline by adding solid MgO if necessary. The solution is shaken at room temperature for 15–17 hours, MgO being added when necessary to keep the solution alkaline. A drop of pyridine is added and the solution is acidified to Congo red paper with conc. HCl, under cooling (ice bath). The solution is extracted into ethyl acetate several times, is then washed several times with 1 N HCl, filtered through a dry filter and evaporated under reduced pressure (bath temperature<40° C.). The resulting crystalline material is carbobenzoxy-L-glutamic acid. M.P.=120° C.

(2) *Preparation of carbobenzoxy-L-glutamyl anhydride*

Carbobenzoxy - L - glutamic acid—
  total yield from procedure 1____ Approx. 30 grams.
Acetic anhydride_____ 80 cc.
Chloroform _____ 37 cc.

80 cc. of acetic anhydride is added to the carbobenzoxy-L-glutamic acid and the resulting solution is warmed for 5–10 minutes at 100° C. This is then evaporated under reduced pressure (bath temperature <50° C.). The residue is dissolved in 40 cc. of dry chloroform, brought to incipient turbidity with (65–110°) petroleum ether and is put in the deep freeze to crystallize (about —20° C.).

Carbobenzoxy-L-glutamyl anhydride—M.P.=94° C.
Yield: 18.3 grams
Percent yield=(on glutamic acid) 70%

(3) *Preparation of carbobenzoxy-L-glutamyl-PAS* p-Aminosalicylic acid (PAS)_____grams__ 4
Carbobenzoxy-L-glutamyl anhydride_____grams__ 6.8
Ethyl acetate, dried for 2–3 hrs. over $P_2O_5$__cc__ 1300

The PAS is placed in a large Erlenmeyer flask and dry ethyl acetate is added with continuous shaking, until the PAS is completely, or nearly completely, dissolved. The resulting solution is cloudy and flocculent. Approximately 800 cc. of ethyl acetate are required. The carbobenzoxy-L-glutamyl anhydride is also dissolved in dry ethyl acetate, approximately 150 cc. of ethyl acetate being required for this. No heat is used in dissolving either the PAS or the carbobenzoxy-L-glutamyl anhydride. The ethyl acetate solution of the carbobenzoxy-L-glutamyl anhydride is added to the ethyl acetate solution of the PAS over a period of 20 minutes, with continuous shaking, in an ice bath. The resulting solution is cloudy and flocculent. The solution is then agitated for approximately 20 hrs. by a magnetic mixer, after which time the solution has nearly clarified and a brown precipitate has appeared. The solution is then filtered through a dry filter, and is concentrated to a solid mass under reduced pressure.

RECRYSTALLIZATION AND PURIFICATION OF CARBO-BENZOXY-L-GLUTAMYL-PAS

The solid mass is dissolved in 95% ethanol with slight heating (<70° C.). The solution is filtered through a dry filter, $H_2O$ is added to incipient turbidity. The solution is then placed in the refrigerator to crystallize. Recrystallization of the carbobenzoxy-L-glutamyl PAS is repeated until the melting point is 197–205° C. (2–3 times).
Yield: 7.8 grams.
Percent yield=72% (on carbobenzoxy-L-glutamyl anhydride)
Percent $N_2$—Found: 6.2%   Theory: 6.97%

(4) *Preparation of L-glutamyl-PAS*

The carbobenzoxy-L-glutamyl PAS (6.7 grams) is dissolved in a solvent mixture consisting of 80 ml. methanol, 4 ml. $H_2O$ and 4 ml. of glacial acetic acid. The solution may be heated slightly (<40° C.). Palladium black (B.D.H.) (Ca. 100 mg.) is added and hydrogen is passed through the solution until a heavy white precipitate (L-glutamyl-PAS) is formed in the reaction vessel and $CO_2$ evolution has ceased entirely (48 hrs.) $CO_2$ evolution may be irregular, but hydrogenation should be continued until the reaction vessel contains a heavy white precipitate. To dissolve this precipitate, $H_2O$ is added, and the mixture is heated until the precipitate has dissolved. A minimal amount of $H_2O$ is added, as a super saturated solution is desired. 100° C. may be reached at this point, without decomposing the compound. When all of the glutamyl-PAS has gone into solution, the hot solution is passed over a celite filter to remove the palladium, and the filtrate is placed in the refrigerator to crystallize. The crystals may then be filtered off and the filtrate concentrated further, seeded and placed in the refrigerator to crystallize. The glutamyl-PAS is recrystallized from hot $H_2O$.

Yield: 3.7 grams
Percent yield=80%
Analysis: Calculated for $C_{12}H_{14}O_6N_2$: C, 51.06; H, 5.00; N, 9.92. Found: C, 50.91; H, 4.98; N, 9.90.

Glycyl-PAS may be prepared in a similar manner, or more conveniently, by chloracetylation of PAS, followed by amination of the chloracetylated product. Other amino acid derivatives of PAS may also be prepared by a method similar to the one outlined above or by some alternative procedure.

For some clinical uses, salts of glutamyl-PAS formed with alkali metals are to be preferred. For example, the mono-sodium salt of glutamyl-PAS has been prepared by combining equivalent proportions of glutamyl-PAS with sodium hydroxide. The monosodium salt thus formed may be precipitated as a crystalline material from aqueous solution by the addition of an alcohol such as ethanol, or by the addition of acetone or similar solvent. Other salts, e.g. the monopotassium or magnesium or calcium salts may be prepared in a like manner. Since glutamyl-PAS has two acidic groups in the molecule, the disodium salt (or dipotassium salt) may also be prepared. Such salts have the advantage over the parent compound, glutamyl-PAS of higher water solubility. The monosodium and similar salts give neutral, pleasant-tasting solution.

It is impossible to estimate the importance of the present invention. The commercial possibilities are tremendous since the potential market includes all persons suffering from tuberculosis.

The preferred embodiments of the invention have been described but these are capable of wide modification without departing from the scope of the invention which will be defined in the appended claims.

We claim:
1. L-glutamyl-para-amino-salicylic acid and its salts of metals from the group consisting of alkali and alkaline earth metals.
2. Salts of L-glutamyl-para-amino-salicylic acid of metals from the group consisting of sodium, potassium, calcium and magnesium.
3. L-glutamyl-para-amino-salicylic acid.
4. The method of preparing glutamyl para-aminosalicylic acid comprising reacting L-glutamic acid with carbobenzoxy chloride in an alkaline medium, reacting the resulting carbobenzoxy-L-glutamic acid with acetic anhydride, forming carbobenzoxy-L-glutamyl-para-aminosalicylic acid by condensing the carbobenzoxy-L-glutamyl anhydride with para-aminosalicylic acid, purifying the para-aminosalicylic acid derivative and removing therefrom the carbobenzoxy residue by catalytic hydrogenation and releasing the L-glutamyl-para-aminosalicylic acid.
5. The method according to claim 4, wherein L-glutamyl-para-amino-salicylic salts are prepared by the reaction of a metal hydroxide of the group consisting of alkali and alkaline earth metals with L-glutamyl-para-amino-salicylic acid.

References Cited in the file of this patent

UNITED STATES PATENTS

| | | |
|---|---|---|
| 2,301,829 | Studer _____ | Nov. 10, 1942 |
| 2,367,878 | Lee _____ | Jan. 23, 1945 |
| 2,721,827 | Gustus _____ | Oct. 25, 1955 |
| 2,789,079 | King _____ | Apr. 16, 1957 |